# UNITED STATES PATENT OFFICE.

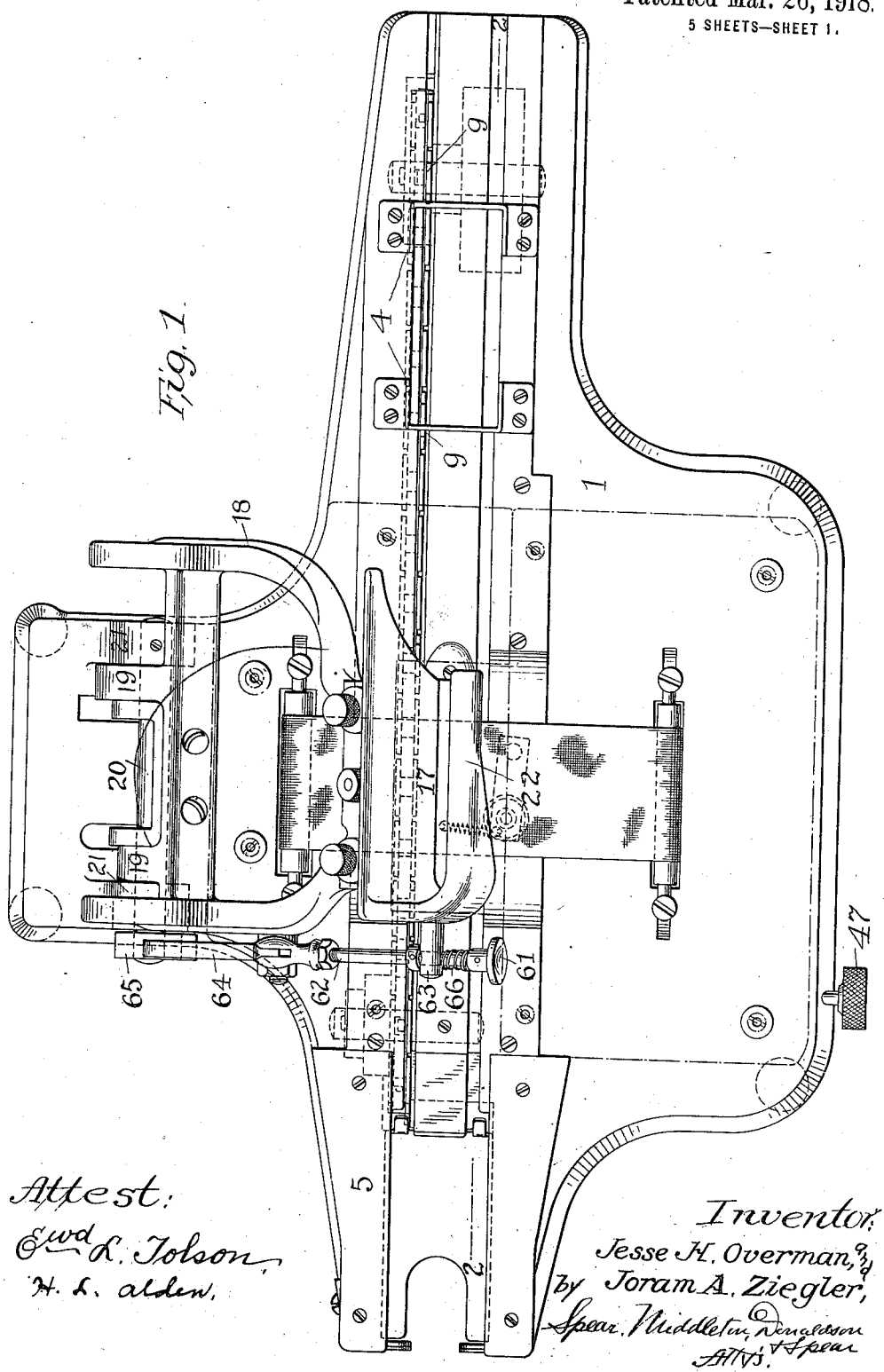

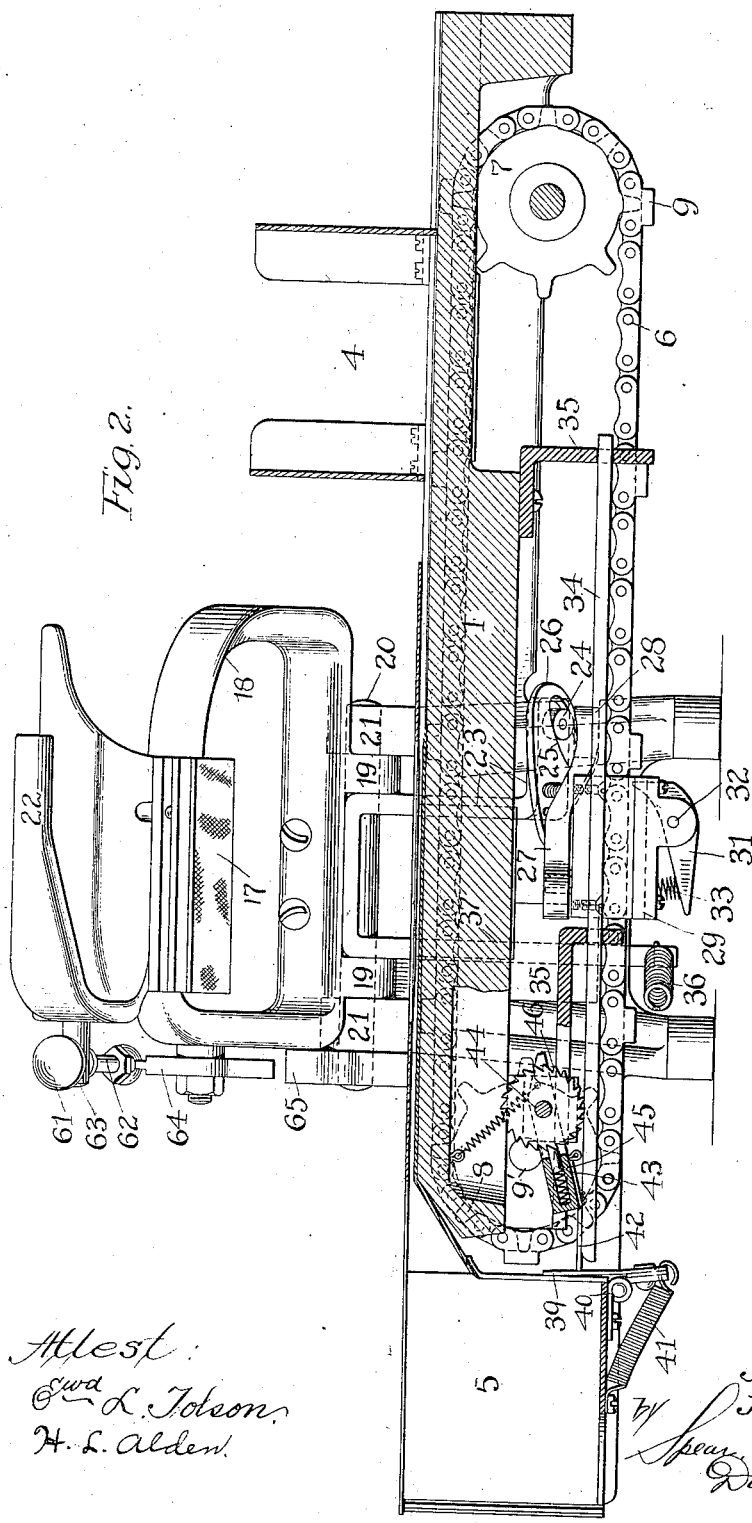

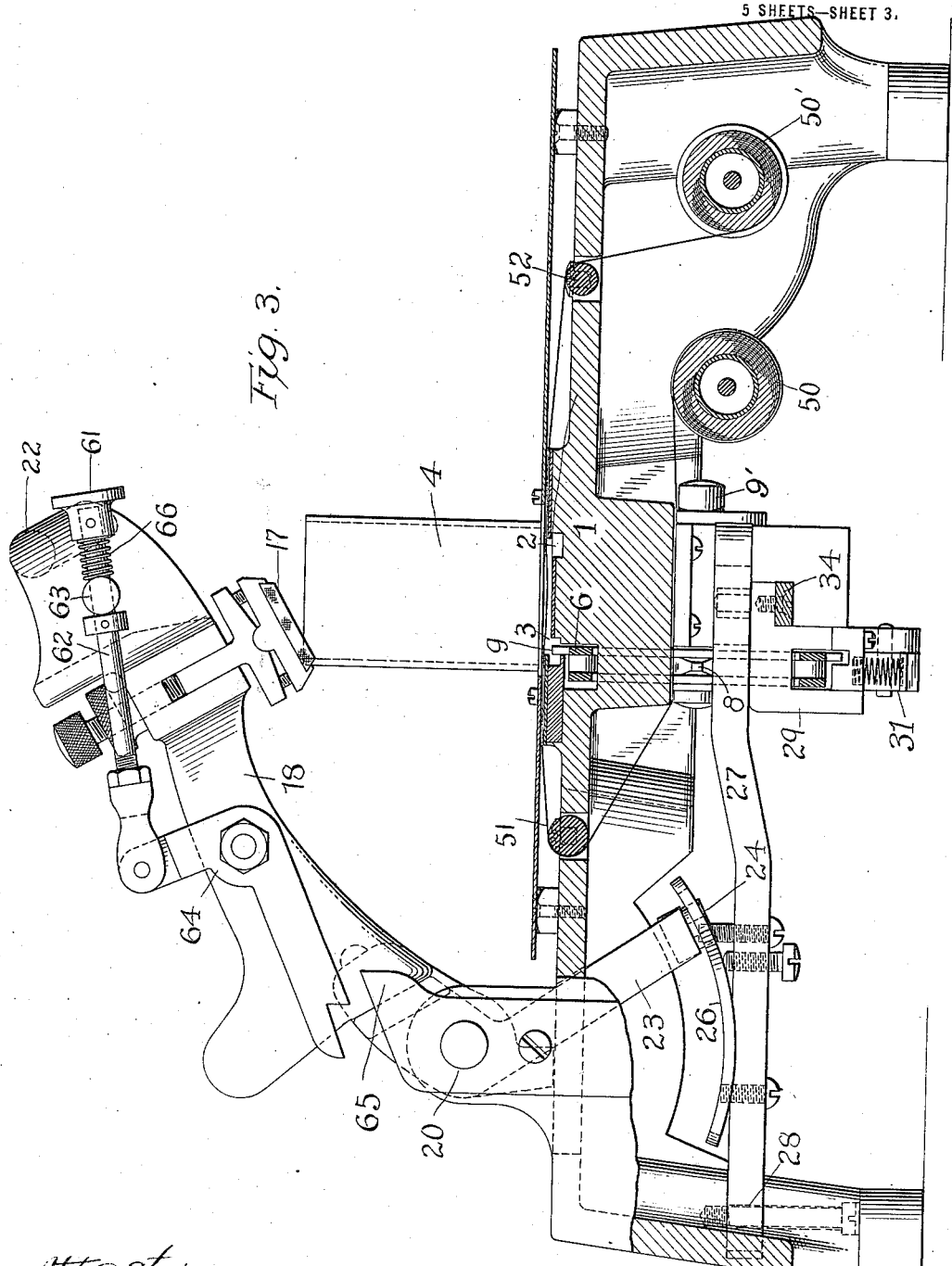

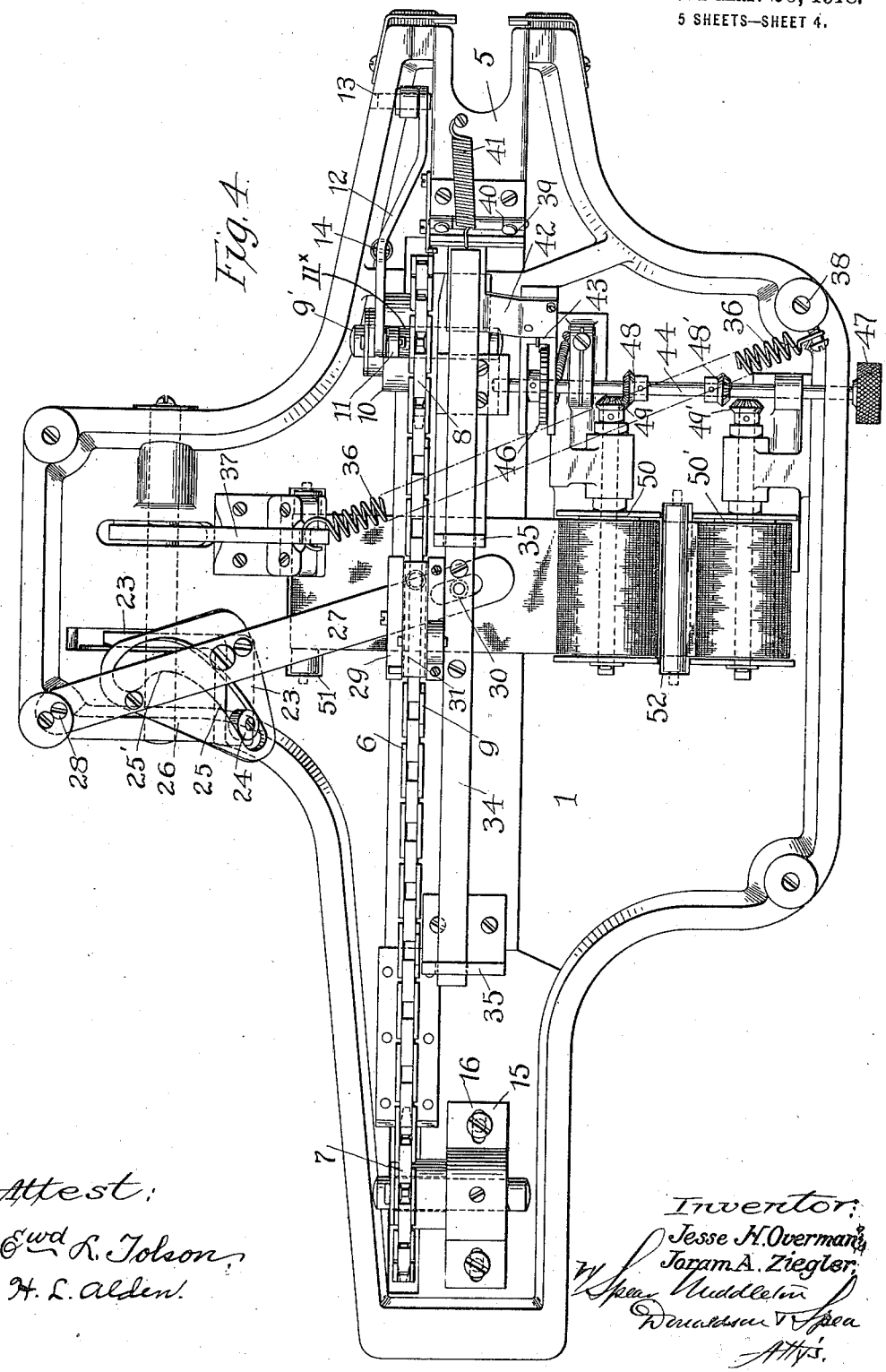

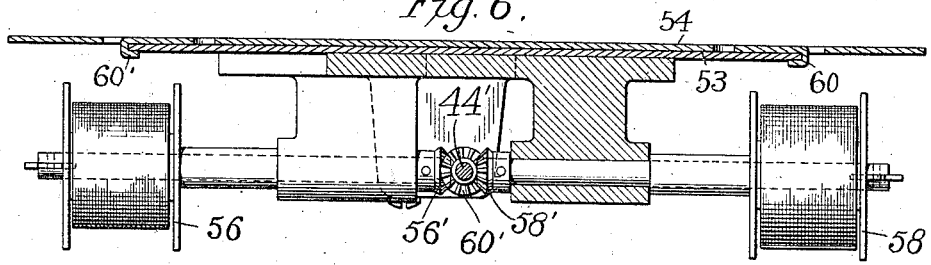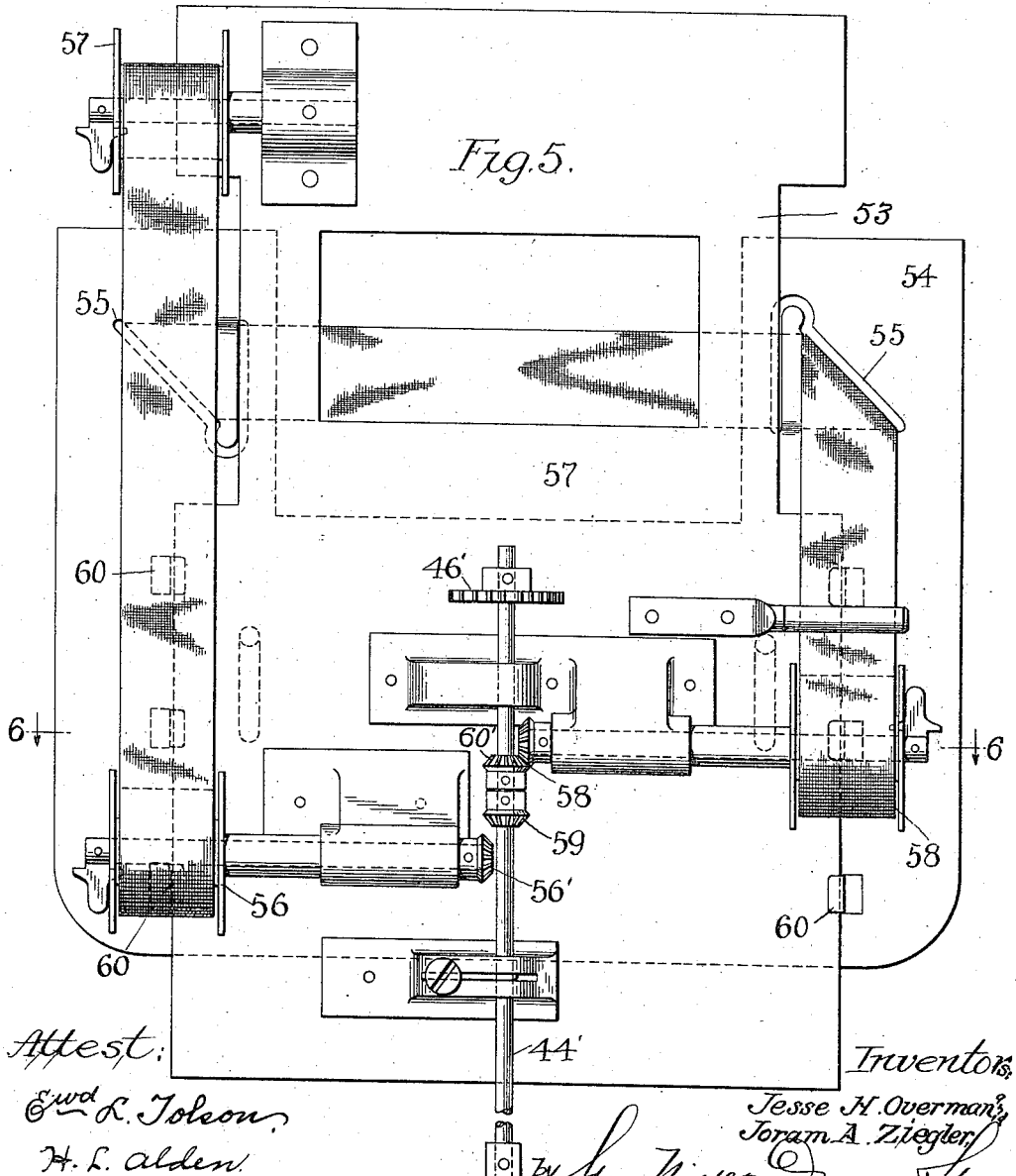

JESSE H. OVERMAN AND JORAM A. ZIEGLER, OF CHATTANOOGA, TENNESSEE, ASSIGNORS TO MONTAGUE MAILING MACHINERY CO., A CORPORATION OF TENNESSEE.

HAND-OPERATED ADDRESSING-MACHINE.

1,260,703.   Specification of Letters Patent.   Patented Mar. 26, 1918.

Application filed June 13, 1913, Serial No. 773,563.   Renewed February 7, 1918.   Serial No. 215,925.

*To all whom it may concern:*

Be it known that we, JESSE H. OVERMAN and JORAM A. ZIEGLER, both citizens of the United States, residing at Chattanooga, Tennessee, have invented certain new and useful Improvements in Hand-Operated Addressing-Machines, of which the following is a specification.

The invention relates particularly to an addressing machine to be operated by hand, and it belongs to that general type of machines in which a series of address plates are fed one by one from a hopper to the printing point, where the address is printed from said plate preferably through an inking ribbon onto the articles by an impression head or pad.

One object of the invention is to insure a proper hammer-like blow to the impression head, notwithstanding the fact that it is operated by hand. For this purpose the impression arm or head is under a certain resistance during a portion of its stroke, which resistance must, of course, be overcome by the operator applying sufficient power, and when the impression head reaches a certain point in its stroke it is relieved from this resistance, and then the power which the operator continues to exert upon the impression head up to this point of its release from resistance will insure that the balance of the stroke of the impression head will be performed under sufficient force to insure the making of a proper impression.

Another object of the invention is to provide means whereby the inking ribbon may be adjusted for bringing different portions thereof to the printing point. Other objects of the invention will appear hereinafter.

The invention consists in the features and combination and arrangement of parts hereinafter described and particularly set forth in the appended claims.

In the accompanying drawings

Figure 1 is a plan view of the machine;

Fig. 2 is a view looking from the front of Fig. 1, but in section along the line 2—2 of Fig. 1;

Fig. 3 is a view looking from the left of Fig. 1, partly in elevation, and partly in section;

Fig. 4 is a bottom plan view of the machine;

Fig. 5 is a bottom plan view of a modification of the inking ribbon movement;

Fig. 6 is a sectional view substantially on the line 6—6 of Fig. 5, parts being shown in section.

In these drawings, 1 indicates the main bed or table having a runway for the address plates in its upper surface, said runway consisting, as shown in Fig. 3, of the grooves 2, 3. At one end of this runway there is a feed chute 4 for the address plates, and at the other end of the runway there is a receiving hopper 5 into which the address plates are moved after being used at the printing point. The groove 3 of the runway receives a feed chain 6 which passes over an idle wheel 7, Fig. 2, which may be in the form of a sprocket or a plain sheave, and the chain also passes over a sprocket wheel 8 located at the opposite end of the runway from the idle wheel 7. The feed chain has projecting dogs 9 for engaging the lowermost plate in the feed chute, and moving this along the runway to the printing point, and thence to the receiving hopper 5. The sprocket wheel 8 is fixed on a shaft 9' which also has fixed thereon a disk or detent wheel 10 with which engages a detent roller 11, which is carried by an arm 12 pivoted to the frame at 13 and pressed by a spring 14, so that the roller 11 will engage either one of two notches in the detent disk, one of which is shown at 11$^x$, and thus accurately determine the position of the feed sprocket 8, in its step by step movement. The notches in the detent disk are 180° apart, and when the address plate has reached the exact printing position the detent or locating roller has entered one of the notches in the face of the detent wheel, thus insuring the exact location of the address plate at the moment of making the impression. The feed chain may be tightened should it become loose by adjusting the sprocket 7 in relation to the sprocket 8, for which purpose the bracket 15 supporting the shaft of the sprocket 7 is adjustably mounted on the frame at 16, Fig. 4. The impression pad or head 17 is carried by an arm or frame 18 which is pivotally mounted on the base or table by ears 19 mounted on a shaft or rod 20 supported in studs 21 of the frame. The impression arm has a handle or grip 22 at its upper free end to be grasped by the hand for operating the machine. An arm 23 projects from the impression arm or frame to a point below the table or base of the machine, and it has at its lower end a roller 24 which works in a slot 25 of a plate 26 which is fixed to a lever or arm 27, said lever being connected pivotally at 28 to the frame. The lever at its free end carries a block 29 which embraces the lower strand or stretch of the plate feed chain, the connection between the lever and the block being by a pin and slot 30, Fig. 4, so that as the lever 27 is moved through its connection with the impression arm, the block 29 will be moved back and forth, and as this block carries a pawl 31 pivotally mounted thereon at 32, and pressed by a spring 33, the movement of the block toward the right in Fig. 2 will cause the pawl to engage one of the projecting dogs 9 of the plate feed chain 6 to give this chain a one-step movement for engaging and feeding an address plate from the feed chute 4 toward the impression point. As the arm 27 with the block 29 moves in the opposite direction or to the left of Fig. 2, the pawl 31 will simply slip over the dogs or dog of the feed chain without effect. The plate 26 is curved corresponding to a portion of a sphere whose radius is equal to the length of the arm 23 from its pivot point to its point of engagement with the plate.

The pawl-carrying block 29 is guided to have reciprocating movement in a straight line parallel to the feed chain by a universal bar 34 attached to the pawl-carrying block, and guided in brackets 35 suitably attached to the frame. The impression arm, together with the lever 27, universal slide bar 34 and pawl block, are returned to normal position when the impression arm is released by a spring 36 connected to the arm 37 projecting below the table, and connected with the impression arm at its upper end, the other end of the spring, as shown in Fig. 4, being connected to the table or bed at 38. It will now be seen that when the impression arm is lowered the address plates will be fed along the runway, and the relation of the parts is such that the movement of the plates along the runway will cease somewhat before the impression head completes its downward movement. This is due to the fact that the cam slot in the plate 26 is so formed that during the first part of the downward stroke of the impression head, or, say, while the impression arm is making two-thirds of its downward stroke, the roller 24, working in the cam slot 25, will have moved the lever 27 and the feed chain far enough to bring the printing plate to the impression point, at which time the movement of the feed chain ceases because of the shape of the cam slot, it having an abrupt turn at 25' so that from this point onward the downward movement of the impression head or arm, say, for the remaining one-third of its stroke, is without effect so far as imparting movement to the plate 26, lever 27, and plate feeding mechanism is concerned, and this remaining one-third portion of the stroke is performed by the impression arm while the address plate and its feeding mechanism remain at rest. As a result of this, it will be seen that the impression arm, during the first two-thirds of its downward stroke, will be under the resistance of the plate feeding mechanism, and sufficient power must be applied by the hand of the operator to overcome this resistance. When two-thirds of the stroke has been completed, however, and the roller 24 begins to move in the straight portion of the slot 25, the resistance will be suddenly removed from the impression arm, and the force applied by the operator continuing will cause the impression arm to descend sharply to apply a hammer-like blow, thus making a good impression. It will, of course, be understood that the cam slot may be so cut as to secure a gradual starting of the plate feeding mechanism and a gradual stopping of the same to overcome the tendency of the address plate to slip by the impression point owing to its momentum.

As a further means of arresting or limiting the movement of the address plate feeding chain, we provide a detent 39 pivoted at 40, Fig. 2, and pressed by a spring 41 to engage the dogs 9 on the plate feeding chain. This detent is held out of operation when the pawl block 29 and universal bar 34 are at the leftward limit of their stroke by an arm or extension 42 which is lifted by the universal bar 34 to thus press backwardly the detent 39. The extension or arm 42 is mounted on a pawl-carrying arm 43 hereinafter described, which is free to turn about the shaft 44 suitably mounted in the frame. When the pawl 31 moves the chain 6, the universal bar 34 is, of course, also moved, thus allowing the extension or arm 42, together with the pawl-carrying arm 43, to drop, thus releasing the detent 39 which immediately gets into position to engage the next dog on the chain 6 when this comes around, so that the feed chain will be stopped accurately in proper position. When the pawl carrier 29, together with the universal bar, are moved toward the left so that the pawl 31 will engage another dog 9 on the chain 6, the left hand end of the bar 34 will lift the pawl-carrying arm 43, and the extension 42, and the latter, coming in contact with the detent 39, will move it out of the path of the dog 9, so that when the next feeding action of the chain is to take place the detent 39 will permit this to be done. The pawl-carrying arm 43 forms part of the ribbon movement, its spring-pressed pawl 45 being arranged to engage the ratchet 46 on the shaft 44, so as to turn this shaft at each movement of the bar 34 toward the left, Fig. 2. The shaft 44 is movable lengthwise in its bearings by taking hold of the knob 47, Fig. 4, so that either one of its beveled pinions 48, 48', may be made to engage with its corresponding pinions 49, 49', on the shafts of the ribbon spools 50, 50', from which spools the ribbon passes over the runway, as shown in Fig. 3, being guided by rollers 51, 52. It will be seen from the arrangement of the pawl lever 43 and ratchet 46 that the shaft 44 will be operated once for each movement of the impression arm upwardly, so that the inking ribbon will be fed past the printing point one step for each upward movement of the impression arm. We show in Figs. 5 and 6 the preferred form of inking ribbon movement.

Fastened to the table of the machine about the impression point is a thin plate 53 having an opening of proper size to permit the passage of the impression head. Above this plate is a second plate 54, and in this latter plate slots 55 are formed at an angle of 45°, which are to change the direction of the ribbon. The ribbon passes from a spool 56 to a directing roller 57 on the under side of the plates, and from the roller 57 it returns and passes through the slot 55, thence across the printing point on the upper side of the plate 54, through the opposite inclined slot 55, and thence to the spool 58. The shafts of the spools 56 and 58 have beveled pinions 56', 58', to mesh with beveled pinions 59 and 60' on the shaft 44', which shaft carries a ratchet wheel similar to that above described 46'. The shaft 44' can be slid longitudinally to drive either one of the spools. The upper plate carries the slots 55 above described, and the lower plate carries the ribbon spools, directing roller, and operating mechanism for these spools. The upper plate is held to the lower one by punched gibs 60, so that the upper plate may be slid forward or backward upon the lower plate in order to bring the desired portion of the ribbon over the address plate. The opening in the upper plate is twice the width of the lower one, so as to admit the passage of the impression pad whether the plate is in its forward or rearward position. It will be understood that the portion of the ribbon which lies between the inclined slots 55 extends over the runway for the address plates, and hence over the address plate when in position to receive the impression.

It will be seen that the ribbon enters one inclined slot from the front of the plate 54, whereas on the other side it enters the other slot from the other direction, that is, from the rear of the said plate 54, this being due to the employment of the idler roller 57. Thus it will be seen that the ribbon is deflected in one direction at one slot 55, and in the other direction at the other slot. The purpose of this is to make the ribbon stretch the same at each edge, because when deflected twice in the same direction it stretches on one edge and soon becomes puckered.

In order to provide means for making a plurality of impressions from the same plate, we provide a finger button 61 the shank 62 of which slides through a guide 63 on the side of the impression arm, Figs. 1, 2 and 3. This shank 62 is connected with a bell crank lever 64 pivotally mounted on the side of the impression arm, said bell crank lever having its end adapted, when in one position, to engage an arrester 65 consisting of a member attached to the base or fixed part of the frame. Normally, the finger button 61 is pressed forwardly by a spring 66, so that the bell crank lever 64 will be held in such a position that its end will not strike the arrester 65 as the impression arm moves up, and therefore when the button 61 is not pressed the impression arm can rise and perform its full upward stroke, as a result of which the pawl 31 for the feed chain 6 will move far enough to the left, Fig. 2, to engage a fresh tooth on the feed chain, so that when the impression arm is moved down the address plate which has just been used will be moved from under the impression head and a new one brought into position to be printed. When, however, it is desired to make two or more impressions from the same plate, the button 61 is pressed by the thumb of the operator, being in convenient position to be reached by the thumb of the same hand which grasps the handle 22, and as a result of the operation of the finger button the bell crank lever 64 will be set so as to engage the arrester 65 on the rise of the impression arm, and this arresting of the impression arm will take place before it has imparted sufficient retracting movement to the carrier means of the pawl 31 to cause this pawl to engage a fresh tooth on the feed chain. Under these circumstances, when the impression arm is arrested, it may be moved down without operating the feed chain, and by keeping the button 61 pressed inwardly any number of impressions can be made from the same plate. It will be understood that the invention is not limited to the precise mechanism shown and described.

It will be observed that the feed of the plates takes place along the table in a direction transverse to the direction of movement of the impression arm. Power from the pivotal movement of the impression arm, however, is transmitted to the address plate feed chain to move it in a horizontal plane, and in a direction transverse to the plane in which the impression arm moves.

We claim as our invention—

1. In combination in an addressing machine, a hand operated impression head, means for holding the address plates, and means for applying a resistance to the movement of said impression head during a portion of its downward stroke, and for removing said resistance during the final part of the downward stroke of the impression head toward the impression point, to produce a hammer blow substantially as described.

2. In combination in an addressing machine, a hand operated impression head, an address plate feeder operated from said head during a partial movement of the same toward the impression point, said address plate feeder applying resistance to said impression head during its partial stroke and removing said resistance during the final part of the stroke toward the impression point, to cause the head to perform a hammer blow substantially as described.

3. In combination in an addressing machine, a hand operated impression member, an address plate feeder connected thereto to be moved by the movement of said impression member on its way to the impression point, and connections between the impression member and the address plate feeder to arrest the address plate feeder and free the impression member from the resistance thereof when said impression member reaches a certain point in its stroke preceding the end of said stroke, to produce a hammer blow substantially as described.

4. In combination in an addressing machine, a hand operated impression member, an address plate feeder, and connections for operating the address plate feeder from the impression member to feed the plates to the impression point while the impression member is moving toward said point, substantially as described.

5. In combination, in an addressing machine, an impression member operated by hand, and an address plate feeder with connections thereto from the impression member, said connections completing the feeding movement of the address plate feeder when the impression head reaches an intermediate point in its stroke toward the impression point, substantially as described.

6. In combination in an addressing machine, an impression member to be operated by hand, an address plate feeder, a lever for operating the address plate feeder having a slotted cam, an arm projecting from the impression member and engaging the said cam, the said cam slot causing the movement of the address plate feeder during a part of the movement of the impression head toward the impression point, and stopping the movement of the address plate feeder when said impression head reaches an intermediate point in its impression stroke, substantially as described.

7. In an addressing machine, the combination of an impression member consisting of an arm pivotally mounted and adapted to be operated by hand, a table, an address plate feeder movable along the table, connections between the pivoted impression arm and the address plate feeder to move the said feeder toward the impression point during a part of the downward movement or impression stroke of the pivoted arm, and to terminate said feeding movement when the impression arm reaches an intermediate point in its impression stroke, substantially as described.

8. In combination a pivoted impression arm, an address plate feeder, a table along which the feeder moves the plates, said feeder consisting of an endless chain, connections between the feeder and the pivoted impression arm consisting of a reciprocating lever, and a pawl connected therewith engaging projections on the feed chain, substantially as described.

9. In combination with the pivoted impression arm, a table, an endless feed chain movable along the table to feed the plates, connections between the impression arm and the feed chain for operating the same, a detent to engage the feed chain, and means operated by the said connections for controlling the position of the said detent, substantially as described.

10. In combination, an impression arm, an address plate feeder consisting of an endless chain having feed dogs thereon, connections between the impression arm and the feed chain consisting of a lever and a pawl, said pawl engaging the dogs on the chain, a detent for engaging the dogs on the chain, and means for controlling the said detent from the said connections, substantially as described.

11. In combination an impression arm, an address plate feeder consisting of an endless chain having feed dogs thereon, connections between the impression arm and the feed chain consisting of a lever and a pawl, said pawl engaging the dogs on the chain, a detent for engaging the dogs on the chain, and means for controlling the said detent from the said connections, said controlling means consisting of a slide bar, substantially as described.

12. In combination a table, an impression arm pivotally mounted at the rear of the table and adapted to be swung downwardly and toward the front of the table in making the impression, said table having a runway for the printing plates, a feeder operating along the runway in a direction transverse to the direction of movement of the impression arm, a handle at the free end of the impression arm, a reciprocatory member having movement along a substantially rectilinear path for operating the feeder and a lever beneath the table moving about a vertical pivot, said lever being operated from the pivoted end of the impression arm and connected with the reciprocatory member, substantially as described.

13. In combination with an impression arm pivotally mounted, a table, an address plate feeder moving along said table in a direction transverse to the vertical plane in which the impression arm moves, an arm extending below the pivot of the impression arm to move therewith, a pivoted lever below the table movable in a horizontal plane, a connection between the horizontally movable lever and the address plate feeder, and a connection between the horizontally movable lever and the arm connected with the impression arm for imparting the movement of the impression arm to the horizontal lever and address plate feeder, substantially as described.

14. In combination in a printing apparatus, a table, a feeder for moving printing plates along said table to the impression point, a hand operated impression member movable toward and from the impression point on said table, and a lost motion connection extending from the impression member to the plate feeder for operating said feeder, said impression member having lost motion during the latter part of the downward stroke thereof, and during the first part of its upward stroke without imparting movement to said plate feeder whereby the feeder will remain at rest while the said impression member is performing the idle portion of its movement in order that multiple impressions may be taken from the same printing plate by the operator limiting the length of stroke of the impression member, substantially as described.

15. In combination in a printing apparatus, a table, a feeder for moving printing plates along said table to the impression point, a hand operated impression member movable toward and from the impression point on said table, a lost motion connection extending from the impression member to said feeder for operating said feeder, said impression member having lost motion during the latter part of the downward stroke thereof, and during the first part of its upward stroke without imparting movement to the plate feeder whereby the feeder will remain at rest while the said impression member is performing the idle portion of its movement in order that multiple impressions may be taken from the same printing plate by the operator limiting the stroke of the impression member and means for limiting the movement of the impression head to its idle stroke, substantially as described.

16. In combination a table, an impression member movable toward and from the same, an address plate feeder with connections for operating the same from the impression arm, said connections being set in position to operate the feeder only when the impression arm performs a full retracting stroke from the impression point the last part of the downward stroke and the first part of the upward stroke of said head being idle in respect to its effect on the plate feeder, and means for limiting any desired retracting stroke of the impression member to prevent the operating connections being set in position to operate the address plate feeder on the next impression stroke whereby multiple impressions may be taken from the same address plate, substantially as described.

17. In combination in an addressing machine, an impression member, a table, an address plate feeder to move the plates along the same, said impression member having movement toward and from the said table, connections for operating the address plate feeder including a pawl which retracts to engage the address plate feeder only when the impression member performs a full retracting stroke the last part of the downward stroke and the first part of the upward stroke of said head being idle in respect to its effect on the plate feeder, and means for shortening any desired retracting stroke of the impression member to limit it to its idle movement and thereby to prevent operation of the address plate feeder on the next impression stroke of the impression member, substantially as described.

18. In combination in an addressing machine, a table, an address plate feeder, a hand operated impression member, connections for operating the address plate feeder which are set only upon the full stroke of the impression member away from the printing point the last part of the downward movement and the first part of the upward movement of said member being idle in respect to any operation of the feeder, and a device for limiting any desired retracting stroke of the impression member, said device being carried partly by the impression member adjacent the hand hold thereon, to be operated by the same hand which operates said impression member, substantially as described.

19. In combination in an addressing machine, a pivotally mounted impression arm, a table, an address plate feeder, connections for operating the address plate feeder from the impression arm, said connections being set only when the impression arm performs a full retracting stroke, a detent on the table, and a finger operated detent on the impression arm to engage the table detent for limiting any desired retracting stroke of the impression arm, substantially as described.

20. In combination an impression arm, a table, an address plate feeder, connections between the impression arm and the address plate feeder for operating the latter, said connections including an oscillating lever, inking ribbon mechanism, and means for operating the same consisting of a slide bar connected with the oscillating lever, substantially as described.

21. In combination an address plate feeder, a detent for the same, inking ribbon mechanism, connections for operating the address plate feeder consisting of an oscillating lever, and a slide bar operated from said lever, said slide bar operating the inking ribbon mechanism and the said detent, substantially as described.

22. In combination in an addressing machine, a table, an impression arm movable toward and from the table, an address plate feeder, a detent for said feeder, inking ribbon mechanism, including a pawl and carrier and a ratchet, connections for operating the address plate feeder, and a member operated by said connections for controlling the pawl carrier and the detent, substantially as described.

23. In combination a manually operated impression member, an address plate feeder, and connections between the impression member and the address plate feeder for operating the said feeder during a part of the impression stroke, by which the head is placed under resistance, and is released from said resistance, when the feeder stops, at an intermediate point in its impression stroke, to then deliver a hammer-blow in making the impression, substantially as described.

24. A manually operated pivotally mounted impression member, an address plate feeder, and connections between the impression member and the address plate feeder for operating the said feeder during a part of the impression stroke, by which the head is placed under resistance and is released from said resistance, when the feeder stops, at an intermediate point in its impression stroke, to then deliver a hammer-blow in making the impression, substantially as described.

25. In combination a pivotally mounted impression member, an address plate feeder moving in a direction transverse to the plane in which the impression member moves, connections for operating the address plate feeder from the impression member, including a lever operated from the pivoted end of the impression member arm, an inking ribbon extending lengthwise of the course of the address plates, spools arranged to one side of said course, guides directing the ribbon at right angles from its position over the feeder to the spools, and means for operating the ribbon spools from the said lever, substantially as described.

26. In combination a pivoted impression arm, a hopper for the printing plates, a table having a runway for the plates, a feeder for moving the plates from the hopper along the runway to the printing point, said feeder having a series of dogs for engaging and spacing the plates thereon, a connection between the feeder and the pivoted impression arm to move said feeder toward the impression point during a part of the downward movement of the impression stroke of the pivoted arm, and to terminate said feeding movement when the impression arm reaches an intermediate point in its impression stroke, substantially as described.

27. A printing apparatus comprising a series of individual printing plates, a hopper for the plates, a table, a plate feeder for moving the plates along the table to the impression point, and impression means capable of long and short reciprocating movement to and from the impression point, said impression means being operatively connected with the plate feeder only during its longer reciprocation to thereby feed the plates, said impression means allowing the plate feeder to remain idle during the shorter reciprocations of said head whereby multiple impressions may be made from the same plate.

In testimony whereof, we affix our signatures in presence of two witnesses.

JESSE H. OVERMAN.
JORAM A. ZIEGLER.

Witnesses:
G. L. HENDERSON,
H. T. PATTON.

Copies of this patent may be obtained for five cents each, by addressing the "Commissioner of Patents, Washington, D. C."